(12) United States Patent
Cooper

(10) Patent No.: US 11,458,560 B2
(45) Date of Patent: Oct. 4, 2022

(54) END ASSEMBLY FOR WELDING DEVICE

(71) Applicant: ELCO ENTERPRISES, INC., Jackson, MI (US)

(72) Inventor: Edward L. Cooper, Clarklake, MI (US)

(73) Assignee: ELCo Enterprises, Inc., Jackson, MI (US)

( * ) Notice: Subject to any disclaimer, the term of this patent is extended or adjusted under 35 U.S.C. 154(b) by 235 days.

(21) Appl. No.: 16/597,366

(22) Filed: Oct. 9, 2019

(65) Prior Publication Data
US 2021/0107085 A1 Apr. 15, 2021

(51) Int. Cl.
*B23K 9/29* (2006.01)
*B23K 9/32* (2006.01)
*B23K 9/173* (2006.01)
*B23K 9/10* (2006.01)
*B23K 9/16* (2006.01)

(52) U.S. Cl.
CPC .............. *B23K 9/295* (2013.01); *B23K 9/325* (2013.01); *B23K 9/1006* (2013.01); *B23K 9/164* (2013.01); *B23K 9/173* (2013.01)

(58) Field of Classification Search
CPC ........ B23K 9/164; B23K 9/173; B23K 9/295; B23K 9/325
See application file for complete search history.

(56) References Cited

U.S. PATENT DOCUMENTS

| | | | |
|---|---|---|---|
| 7,342,200 B2 | 3/2008 | Eberle | |
| 2003/0057196 A1 | 3/2003 | Jones | |
| 2006/0289413 A1 | 12/2006 | Eberle | |
| 2007/0062922 A1* | 3/2007 | Zamuner | B23K 9/295 219/137.31 |
| 2008/0035623 A1 | 2/2008 | Hutchison | |
| 2009/0107958 A1 | 4/2009 | Khakhalev | |
| 2015/0136747 A1* | 5/2015 | Hassan | B23K 9/26 219/137.52 |
| 2016/0311050 A1* | 10/2016 | Cooper | B23K 9/295 |

* cited by examiner

*Primary Examiner* — Justin C Dodson
(74) *Attorney, Agent, or Firm* — Dickinson Wright PLLC

(57) ABSTRACT

An end assembly for use with a welding device having a contact tip, a diffusor body, and a gooseneck. The contact tip has a convex end surface that contacts and mates with a concave end of the diffuser body. The diffuser body forms a blind bore forming central web and a series of passageways. A longitudinal passageway segment is formed in the contact tip parallel with the central longitudinal electrode bore of the contact tip. A second passageway segment joins the first longitudinal passageway segment. When the contact tip is affixed to the diffuser body, a chamber is formed at the base of the contact tip communicating with the diffuser body passageways. Shielding gas that flows into the diffuser body passes through the web passageways into the chamber and through the first and second passageways of the contact tip to provide shielding gas to the weld site and cool the contact tip during welding operations.

20 Claims, 9 Drawing Sheets

END ASSEMBLY FOR WELDING DEVICE

FIELD OF THE INVENTION

The present invention relates to an end assembly for use in a welding device. In particular, the present invention relates to end assembly for controlling the flow of gas during welding.

BACKGROUND

Metal Inert Gas (MIG) welding also referred to as "wire-feed" or Gas Metal Arc Welding (GMAW) utilizes heat from an electrical arc to melt a consumable electrode to form a weld on a workpiece. A MIG welding system typically includes a power supply, a gas supply and an electrode supply connected to a welding device or welding gun. A ground cable is used to connect the workpiece to the power supply. The welding device generally includes a handle, a gooseneck and an end assembly. The welding system can be automatic or semi-automatic and may be manually or robotically controlled. The electrode and gas are coupled through a conduit in the handle and the gooseneck to the end assembly of the welding device. The electrode extends through the contact tip of the end assembly and the gas moves around the contact tip in the nozzle of the end assembly. When the welding device is activated, the electrode is fed through the contact tip toward the workpiece and the gas is directed through the nozzle towards the workpiece. When the electrode is placed adjacent to will or in contact with the workpiece, the electrode completes an electrical circuit between the power supply and the workpiece, allowing current to flow through the electrode to the workpiece. The current produces an arc between the electrode and the workpiece. The heat of the arc melts the electrode and the workpiece in the region surrounding the arc, creating a weld puddle. The gas flowing out the nozzle shields the weld puddle from atmospheric gases and outside contaminants. The type of gas used in MIG welding varies depending on many factors. Noble or inert gases such as Argon are often used. However, Carbon Dioxide ($CO_2$) and a mixture of gases such as $CO_2$ and Argon are also used. Once the electrode is moved away from the workpiece, the electric circuit is broken and the weld puddle cools and solidifies, forming a weld.

There remains a need for an end assembly for a welding device which allows for better control of the flow of shielding gas around the weld puddle and which enhances cooling of the tip during use.

BRIEF SUMMARY OF THE INVENTION

The end assembly of the present invention is used with a welding device for GMAW. In one embodiment, the end assembly includes a gooseneck, a diffuser body, a contact tip and a nozzle. The components of the end assembly are secured together so as to share a common axis. The diffuser body features a number of passageways for allowing shielding gas to flow into an annular space between the diffuser body, contact tip and nozzle. In addition, the diffuser body features passageways extending toward the contact tip and communicates with a gas chamber. The gas chamber in turn provides gas to one or more passageways in the contact tip. In one embodiment, a plurality of tip passageways are arranged parallel to and around the central electrode bore of the contact tip. In another embodiment, the central electrode passageway of the tip is backboard at the base of the tip to provide clearance for gas flow to a series of transverse passageways through the nozzle tip. In both embodiments, the gas flow channels, combined with the gas flow around the outside annular surface of the nozzle tip, provide improved shielding and cooling of the welding tip.

Further still, the present invention relates to a contact tip for a welding device having a radiused or rounded convex curved first end, and a radiused or rounded second end with a center bore extending. The second end of the diffuser body has buttress threads with mate with buttress threads of the contact tip. The diffuser body has a radiused or rounded concave surface. When the contact tip is attached to the diffuser body, the mating concave and convex surfaces are brought into direct contact, providing excellent thermal and electrical conductivity between these components. In the first embodiment, the above-described tip gas flow channels are positioned directly adjacent to the central electrode bore so as not to interfere with the contact between the mating concave and convex surfaces of the contact tip and diffuser body. In the second embodiment, the contact tip features an enlarged electrode passageway at the base of the tip, with the bore at the entrance end of the contact tip radially inside the concave and convex surfaces of the diffuser body and contact tip. In both embodiments the diffuser body together with the contact tip form a gas flow chamber at the base of the contact tip which serves to distribute shielding gas to the flow passages of the contact tip.

The substance and advantages of the present invention will become apparent by reference to the following drawings and the description.

DETAILED DESCRIPTION OF THE INVENTION

Figure 1:
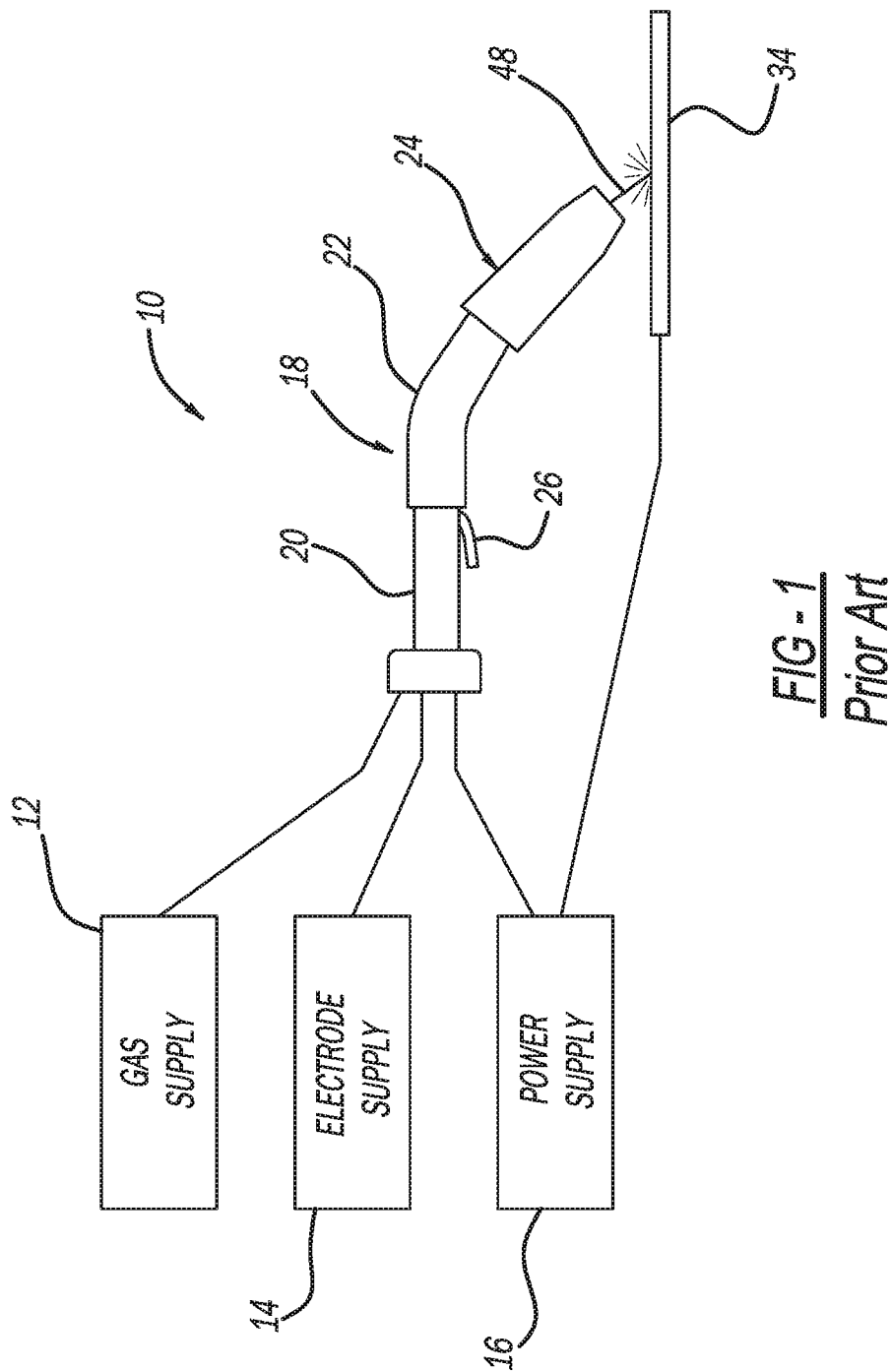
FIG. 1 is a schematic illustration of a GMAW welding system of a prior art design.

FIG. 1 is a general, schematic representation of MIG welding system 10. The welding system 10 includes gas supply 12, electrode supply 14, and electrical power supply 16 connected to welding device 18. In general, welding device 18 includes handle 20, gooseneck 22 and end assembly 24. Welding device 18 also includes an activation switch which, in one embodiment, is trigger 26 on handle 20. Welding system 10 is used to perform a welding operation on workpiece 34. It is understood that the welding system 10 can be operated similar to welding systems well known in the art.

Figure 2:
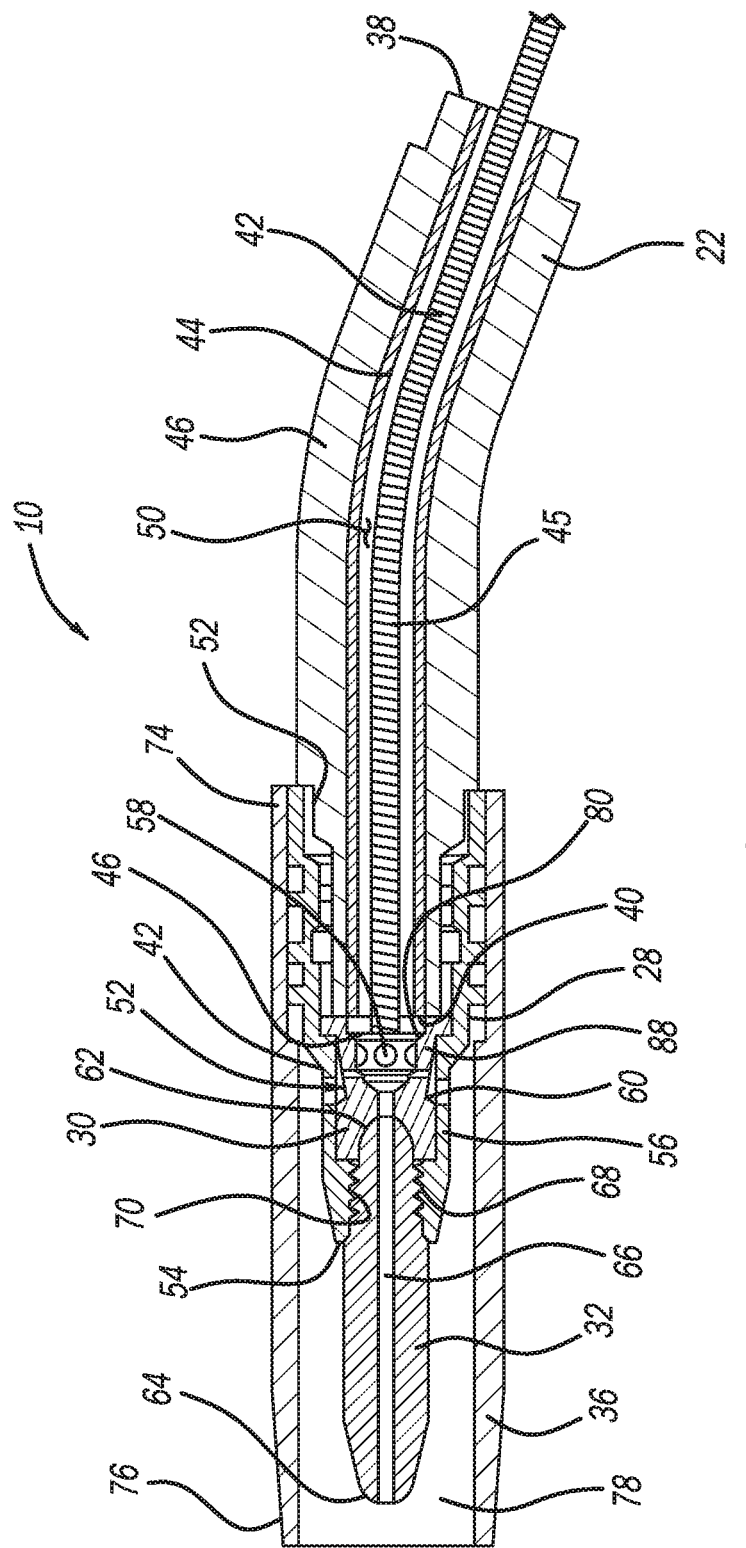
FIG. 2 is a longitudinal cross-sectional view of an end assembly of a prior art GMAW welding system.

FIG. 2 shows a design of end assembly 10 in accordance with a prior art design having gooseneck 22, diffuser sleeve 28, insert 30, contact tip 32 and nozzle 36. Gooseneck 22 has opposed first and second ends 38 and 40, with passageway 42 extending therebetween. First end 38 of the gooseneck 22 is connected to handle 20 of welding device 18. Gooseneck 22 includes inner conduit 44 which extends between ends 38 and 40, and forms passageway 42. Inner conduit 44 is constructed of an electrically conductive material. In the example presented, inner conduit 44 is made of copper. Wire guide 45 is formed from a wound wire and is a flexible cable having a center bore for allowing passage of electrode 48. Gooseneck 22 also includes outer housing 46 or covering which protects inner conduit 44. Passageway 42 of gooseneck 22 is sized to enable wire guide 45, electrode 48 and gas 50 to move through the passageway from first end 38 will.

Diffuser sleeve 28 has opposed first and second open ends 52 and 54, with wall 56 therebetween, forming inner cavity 58. First end 52 of diffuser sleeve 28 is mounted on second end 40 of gooseneck 22. Inner cavity 58 extends between open first end 52 and open second end 54. The size and shape of inner cavity 58 of diffuser sleeve 28 varies depending on the type of gooseneck 22, the size of insert 30, and the type of contact tip 32 used. Wall 56 has a least one radially extending passageway 60. In one embodiment, wall 56 has a plurality of passageways 60 spaced around the perimeter of the wall. Passageways 60 in wall 56 are in fluid communication with gooseneck passageway 42.

Contact tip 32 is connected to second end 54 of diffuser sleeve 28. First end 62 of contact tip 32 extends into inner cavity 58 of diffuser sleeve 28. Center bore 66 of contact tip 32 extends along the longitudinal axis of the contact tip. When contact tip 32 is secured in second end 54 of diffuser sleeve 28, center bore 66 of contact tip 32 is coaxial with the longitudinal axis of the diffuser sleeve. In one embodiment, external threads 68 are formed adjacent to first end 62 of contact tip 32 which mate with internal threads 70 on the interior surface of inner cavity 58 of diffuser sleeve 28. Threads 68 and 70 are preferably formed as buttress profile threads.

In the prior art example presented, first end 62 of the contact tip 32 has a radiused or rounded convex outer end surface. Second end 64 of contact tip 32 is also radiused. Nozzle 36 has open second end 76 with gas channel 78 surrounding contact tip 32. When nozzle 36 is secured on diffuser sleeve 28, the nozzle extends outward from first end 74 along diffuser sleeve 28 toward second end 76 so that wall 56 of diffuser sleeve 28 is in gas channel 78 and passageway 42 in wall 28 of diffuser sleeve 20 and gas channel 78 of nozzle 36. Nozzle 36 extends along contact tip 32 so that contact tip 32 is in gas channel 78.

Insert 30 has a first end 80 and a second end 82 and forms at least one radial passageway 88. Passageways 88 are in fluid communication with gooseneck passageway 42 and sleeve passageway 60. Shielding gas flowing into gooseneck 22 escapes into the radial gap situated between tip 32 and nozzle 36 to provide shielding gas flow to the weld site.

In the prior art example presented, the inner surface of insert second end 82 is formed with a radiused or rounded concave surface which matches first end 62 of the contact tip 32. This contact at the concave and convex surfaces provides excellent electrical and thermal conductivity between tip 32 and insert 30.

Figure 3:
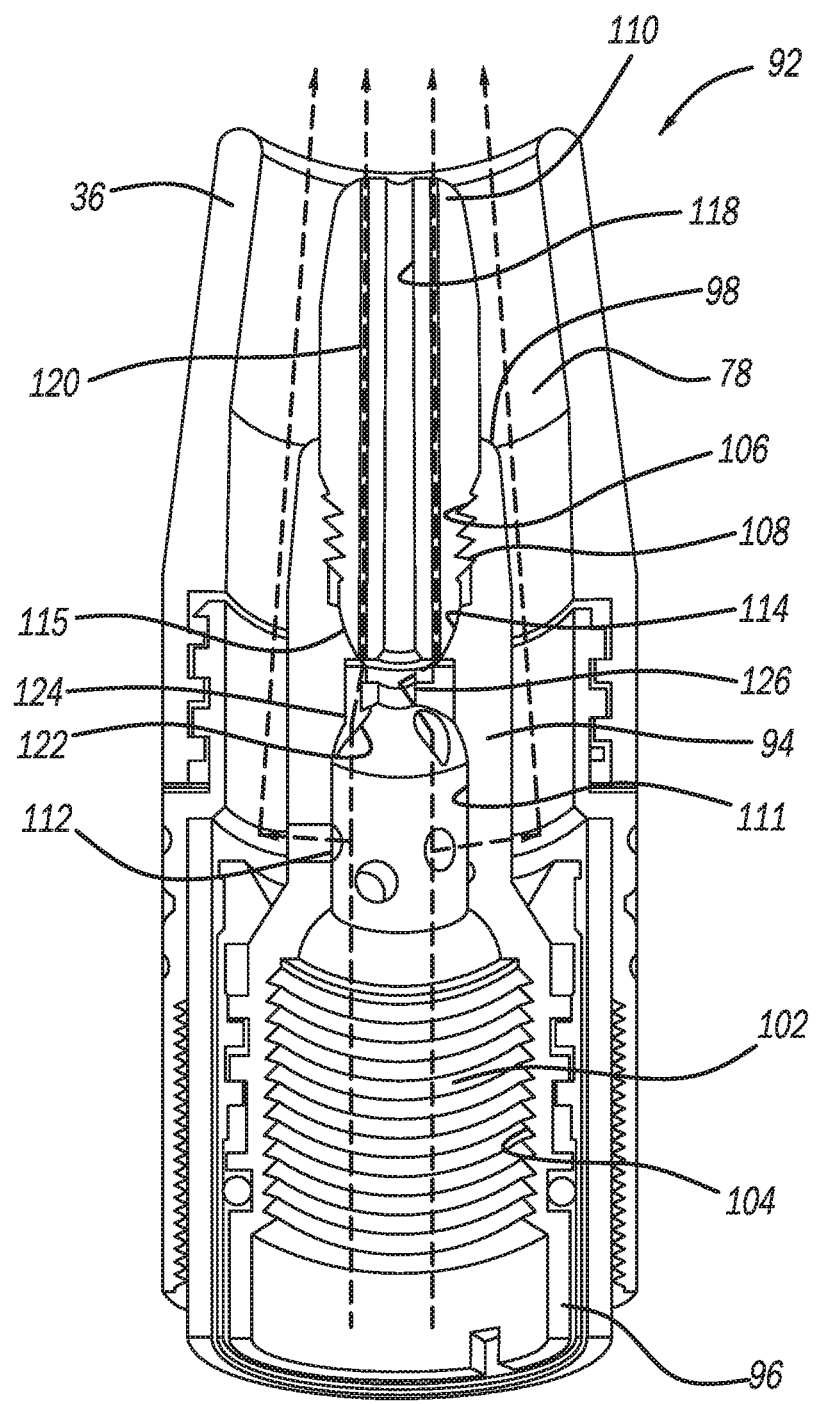
FIG. 3 is a longitudinal cross-sectional view through a nozzle assembly in accordance with a first embodiment of the present invention.

Now with reference to FIGS. 3-6, a first embodiment of an end assembly of the present invention is described. Elements of this first and the later describe second embodiment having equivalent function as in the prior art example described above are identified by like reference numbers. Referring in particular to FIG. 3, end assembly 92 is shown. In this instance, diffuser body 94 integrates the functions of the previously described prior art diffuser sleeve 28 and insert 30, such that the insert component is not used. Here, diffuser body 94 forms first end 96 and second end 98 with central passageway 102 formed by internal bore 111 therebetween. Diffuser body 94 forms internal threads 104 which receive a threaded end of gooseneck 22. Diffuser body 94 further forms, at second end 98, a concave bore area having internal threads 106 which mesh with external threads 108 of contact tip 110. Diffuser body 94 forms a series of radially extending passageways 112 which allow shielding gas to flow in a radially outward direction from internal passageway 102 into the annular space within nozzle 36. In a manner similar to the previously described prior art example, diffuser body 94 forms concave radiused seat surface 114 which closely conforms with matching convex surface 115 of first end 116 of contact tip 110. Concave and convex surfaces 114 and 115 are, in geometric terms, formed by a curved line rotated about the central longitudinal axis of tip 110. Contact tip 110 forms, as in the prior art, central longitudinal electrode bore 118. Differing from the prior art, in this embodiment contact tip 110 further forms a series of gas flow passageways 120 which are parallel to central bore 118 and spaced at regular angular intervals around the central bore. In one embodiment, three gas flow passages 120 are formed, but other numbers could also be implemented. Shielding gas under pressure inside diffuser body 94 flows through radially outer passageways 102 and also in a longitudinal direction into and through gas flow passageways 120.

When contact tip 110 is threaded into diffuser body 94, the above-described matching concave and convex surfaces 114 and 115 are brought into intimate contact which provides excellent electrical and thermal conductivity. The lowermost surface of contact tip 110 forms flattened first end 116. The radial positioning of gas flow passageways 120 is provided within flattened end 116 such that these passageways do not interfere with the previously described surface to surface contact provided at surfaces 114 and 115.

Figure 4:
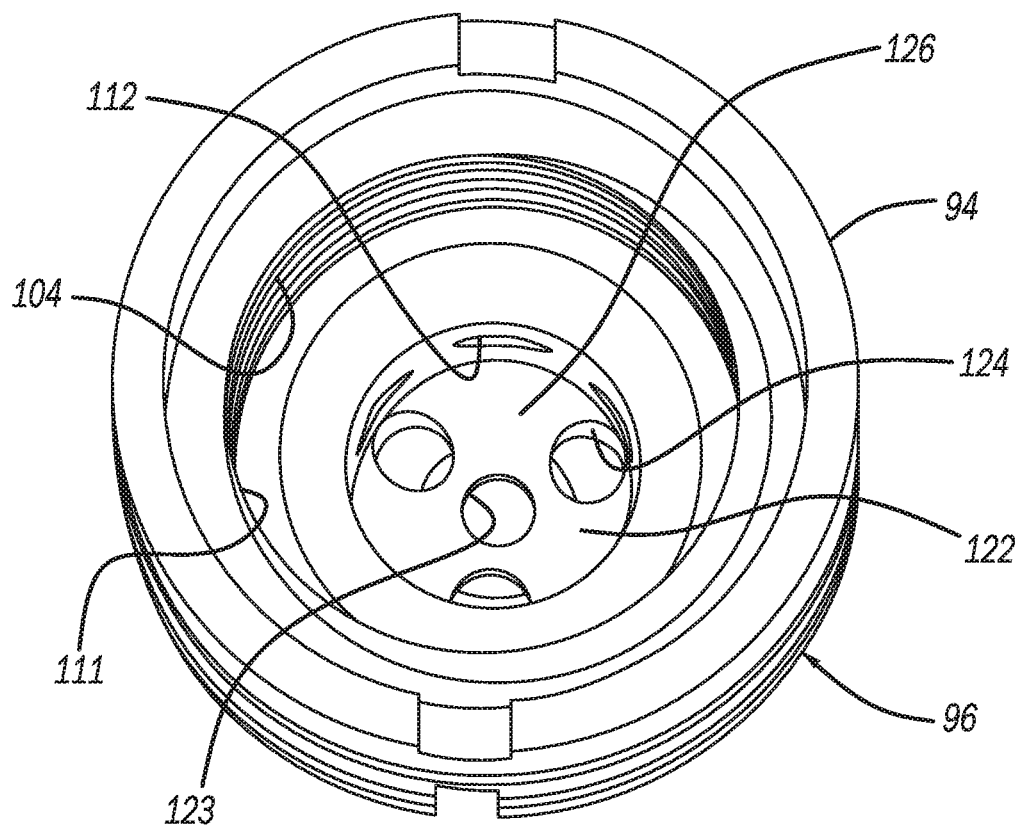
FIG. 4 is a perspective view of the gas entrance end of the diffuser body.
Figure 5:
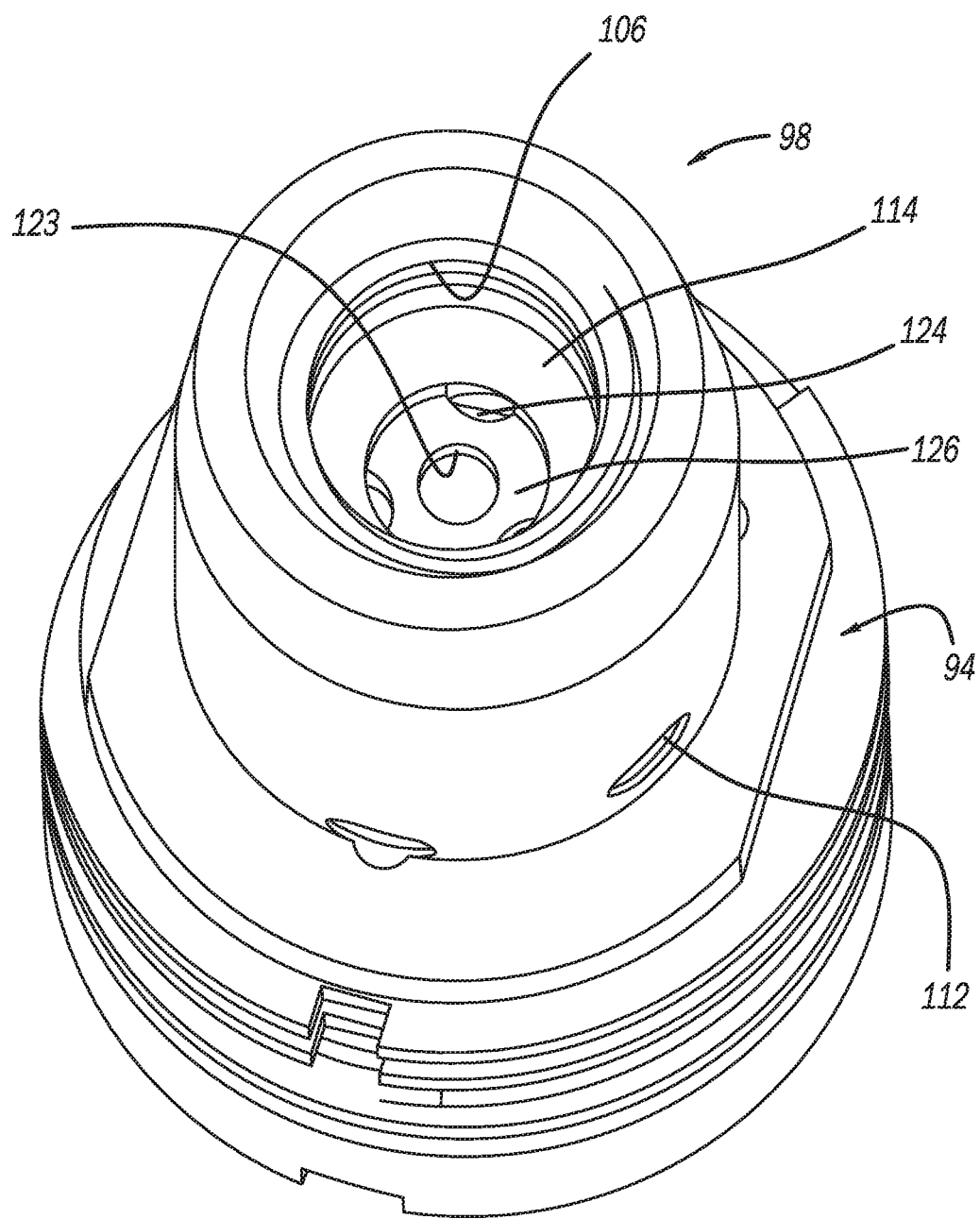
FIG. 5 is a perspective view of the gas exit end of the diffuser body which receives the contact tip.
Figure 6:
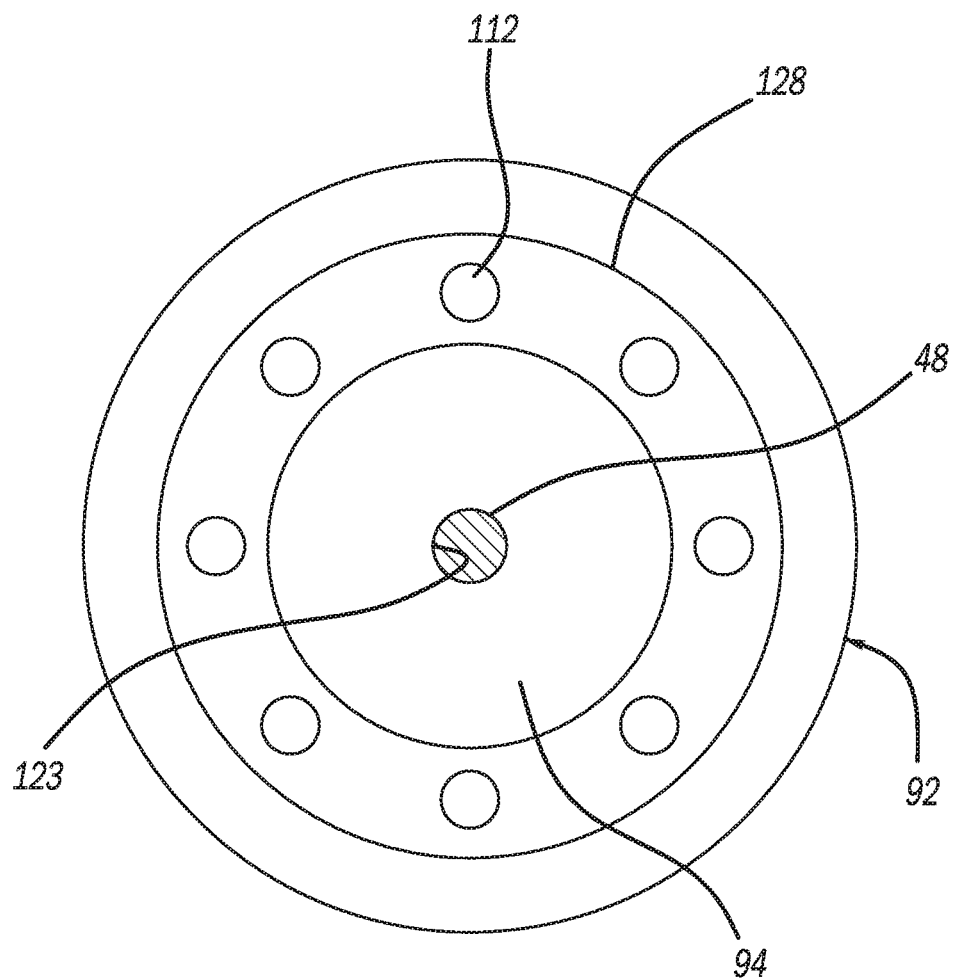
FIG. 6 is a cross-sectional view through the nozzle.

FIG. 4 is an enlarged pictorial view of the inside of diffuser body 94, viewed in an upward direction from first end 96. As shown, this area features central blind bore section 122 formed with a radiused inside surface such as formed by a ball mill type tool. Between the surface formed by blind bore 122 and concave surface 115 is web 126. A series of bores are formed through web 126 including central bore 123 provided for passage of electrode 48 and a series of radially offset bores 124 provided for the flow of shielding gas. FIG. 5 shows diffuser body second end 98 viewed from above, into the diffuser second end 98. This view also shows annular seat surface 114 of diffuser body 94 which mates with contact tip surface 115. As shown in FIG. 5, bores 124 can be provided radially displaced from the longitudinal axis of contact tip 110, such that only a portion of the bore is exposed to chamber 128. It is necessary that bores 124 communicate with chamber 128 to provide gas flow passage.

Referring now in particular to FIGS. 3-5, web 126 is displaced such that when contact tip 110 is installed within diffuser body 94, there is a separation between the base first end 116 of the contact tip and web 126, forming chamber 128. As best shown by the arrows in FIG. 3, shielding gas flows upwardly through internal passageway 102 and some of the gas flows in a radially outward direction through diffuser body passageways 112. Another portion of the gas continues to flow upward in an axial direction through bores 124 in web 126 and communicates with chamber 128. Chamber 128 enables gas flowing through holes 124 to communicate with contact tip passageways 112 regardless of the rotational indexed final position of the contact tip when it is threaded into diffuser body 94. Chamber 128 provides a distribution of the shielding gas through each of gas flow passages 120. Another function of web 126 is to provide a surface abutting the distal end of wire guide 45 which is installed within diffuser body central bore 111 while further allowing the flow of shielding gas to contact tip 110.

In this embodiment, contact tip central bore 118 is dimensioned to be just slightly larger than the outside diameter of electrode 48. This clearance provides enough space for smooth passage of electrode 48 while also providing the necessary electrical contact connection between contact tip 110 and the electrode. It is known that electrode 48 can be provided having various cross-sectional shapes, the most typical being a circular or round shape. However, other shapes such ellipses and other non-round configurations can be provided. In these cases, the shape of the contact tip bore and associated electrode are matched.

Figure 7:
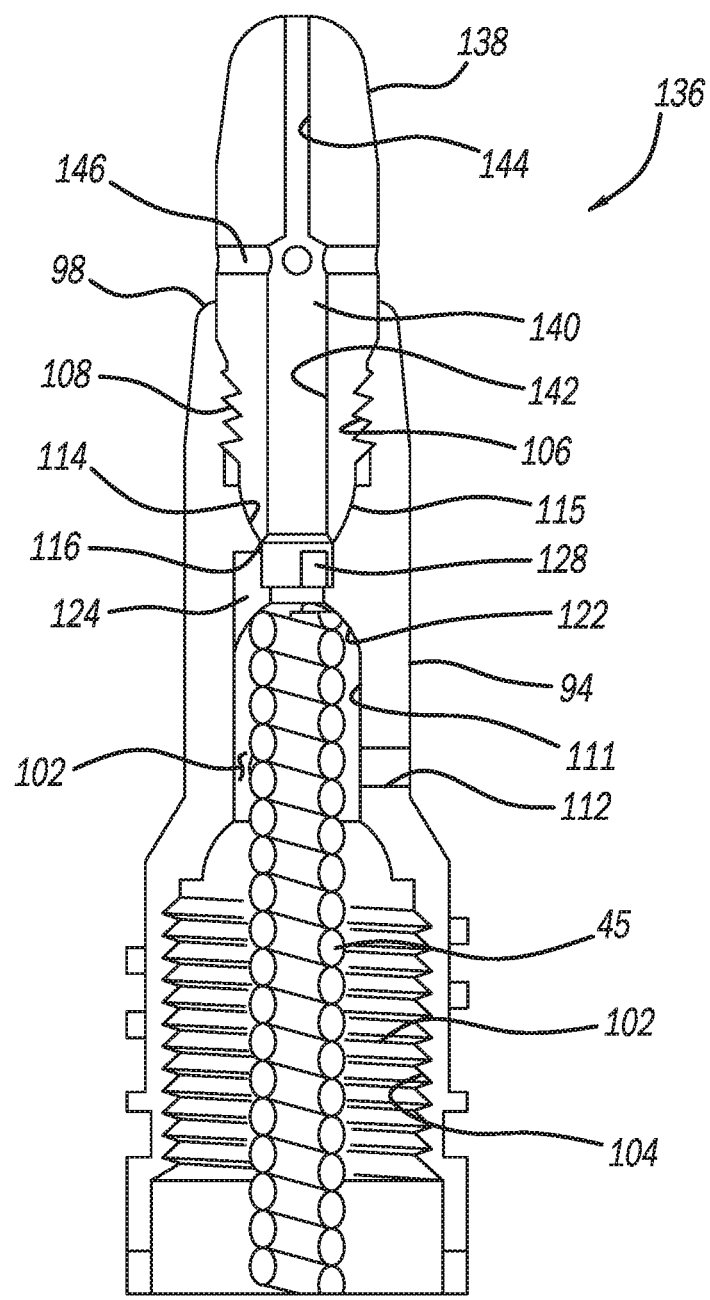
FIG. 7 is a cross-sectional view of an end assembly in accordance with a second embodiment of the present invention.
Figure 8:
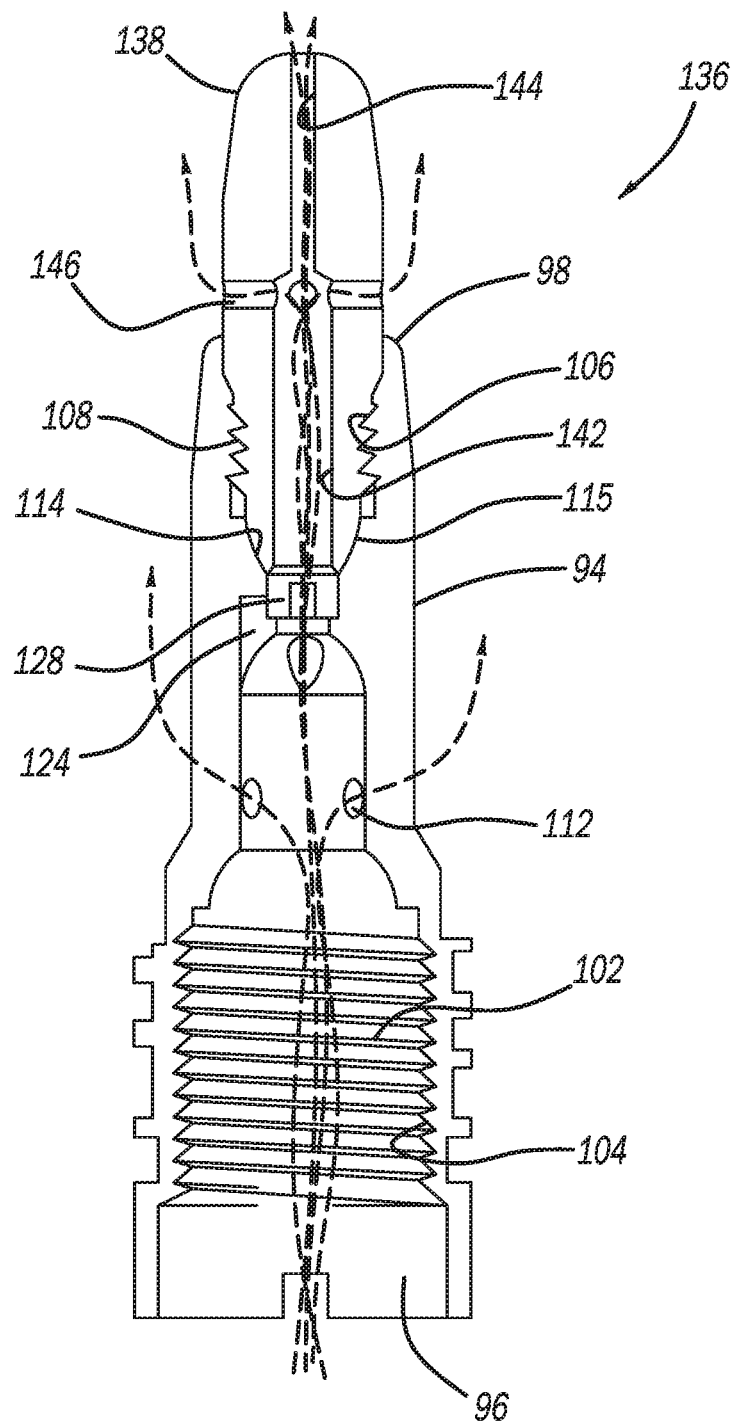
FIG. 8 is a cross-sectional view similar to FIG. 7, showing gas flow paths through the end assembly.
Figure 9:
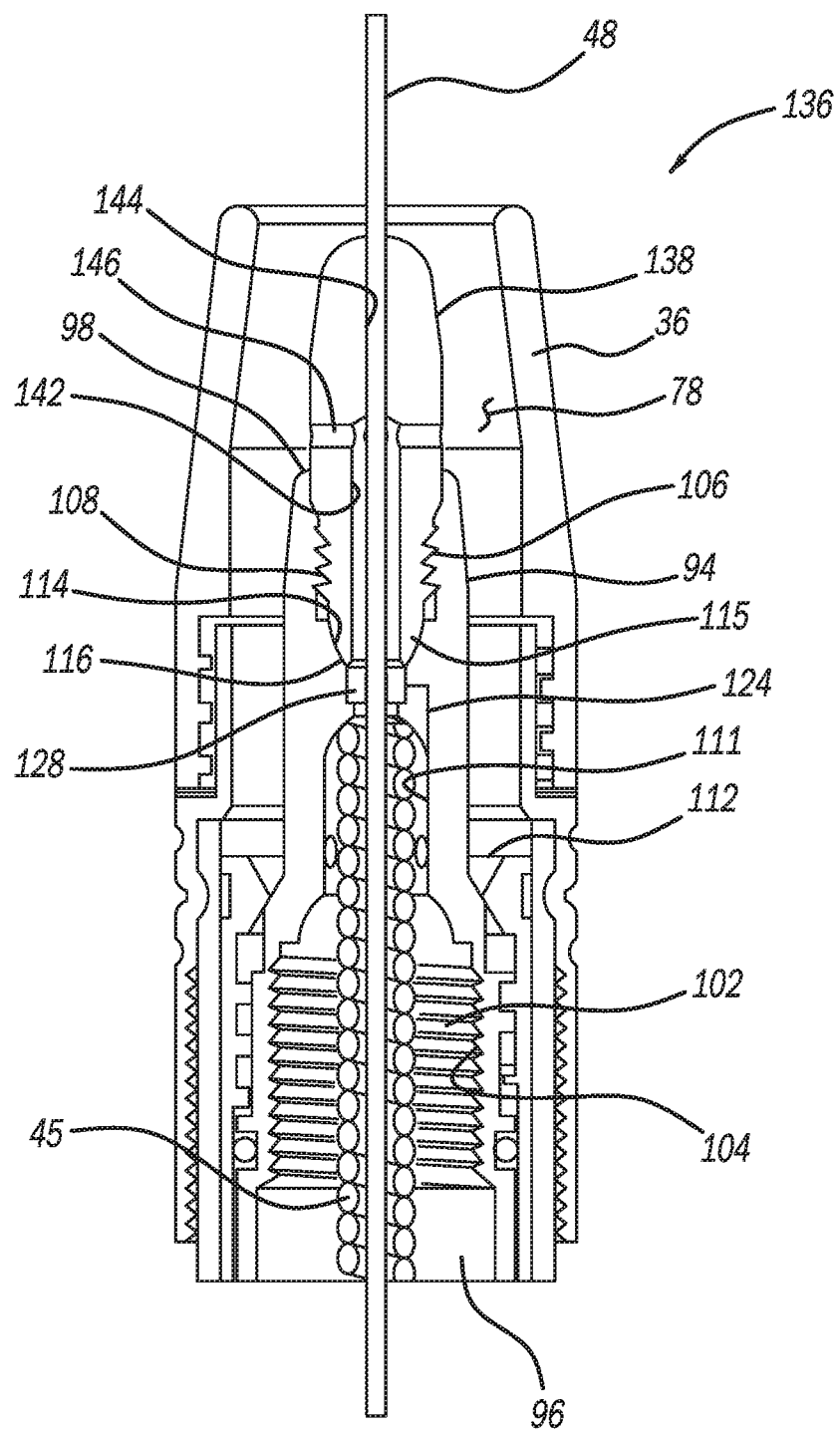
FIG. 9 is a cross-sectional view of the end assembly of FIG. 7, shown with an electrode wire passing through the end assembly.

Now with reference to FIGS. 7, 8 and 9, a second embodiment of an end assembly is shown, here designated by reference number 136. End assembly 136 utilizes diffuser body 94 identical to the prior embodiment. Differences in end assembly 136 relate to the configuration of contact tip 138. In this case, contact tip does not feature the parallel gas flow passages 120. Instead central nozzle bore 140 features an initial larger diameter section 142 and a distal section 144. Bore section 142 as a diameter substantially larger than the outside diameter of electrode 48 providing an annular space for the flow of shielding gas. However, distal bore section 144 closely conforms to the outside surface shape of the associated electrode 48 and provides electrical and thermal contact with the electrode. At the intersection of bore sections 142 and 144 a series of cross bores 146 are provided. In a preferred embodiment cross bores 146 are perpendicular to the longitudinal axis of the nozzle and a pair are provided which are mutually perpendicular. Cross bores 146 terminate at a side outside surface of contact tip 138. In this preferred embodiment, four outside gas escape passages are formed by the pair of cross bores 146.

Contact tip 138 of end assembly 136 features the same interaction with diffuser body 94, and provides the same convex and concave surfaces 114 and 115 for contact connection between contact tip 110 and diffuser body 94 which provides excellent thermal and electrical conductivity. These surfaces are formed outside the diameter of bore section 142.

FIG. 7 shows and assembly 36 with wire guide 45 installed. As shown wire guide 45 is seated against the end surface of blind bore 122. This configuration would also be used in the first embodiment of end assembly 92. As shown, bore 111 has a larger diameter than the outside diameter of wire guide 45. Also, where wire guide 45 abuts the blind end of bore 111, bores 124 are positioned outside the outer diameter of the wire guide providing for the flow path of shielding gas into chamber 128.

FIG. 8 shows in drawn lines the flow of shielding gas through and assembly 136. As shown, shielding gas is initially provided to the inside bore 111 of diffuser body 94. A portion of the gas flow flows radially out of bores 112. Another portion of the flow travels toward tip 138, flowing through offset bores 124 into chamber 128 and into the radial clearance provided between the enlarged bore section 142 and electrode 48. This flow travels along contact tip 138 until it reaches the point of intersection with cross bores 146 were the gas flows radially outward of the contact tip. A very small proportion of the gas is permitted to flow between the small radial clearance between electrode 48 and the inside diameter of the small bore section 144. End assembly 136 is adapted to be used with nozzle 36 as shown in FIG. 3. Accordingly the escaping shielding gas is directed to flow around the weld site at the distal end of contact tip 138.

Both embodiments of end assemblies 92 and 136 provided for enhanced cooling of the contact tips 110 and 138 since there is a significant flow of shielding gas through internal passages within the contact tips. This provides numerous benefits. One significant benefit is that, with the contact tips being kept at a cooler temperature due to heat transfer to the shielding gas, there is a reduced tendency of the distal end of the context tips 110 and 138 to accumulate welding splatter on the contact tips which is a major cause of maintenance requirements. Furthermore, excessive heating of the contact tips causes softening of the contact tip material which can lead to enlargement of the electrode bore at the distal end of the tip, which negatively impacts the precision with which the electrode wire 48 is directed to the workpiece and reduces effective electrical conduction with the electrode. Cooler contact tips during welding operations has been shown to significantly increase the useful life of the contact tips.

In the foregoing description, various features of the present invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated by reference herein in their entirety, with each claim standing on its own as a separate embodiment of the present invention.

It is intended that the foregoing description be only illustrative of the present invention and that the present invention be limited only by the hereinafter appended claims.

While the above description constitutes the preferred embodiment of the present invention, it will be appreciated that the invention is susceptible to modification, variation and change without departing from the proper scope and fair meaning of the accompanying claims.

I claim:

1. An end assembly for an arc welding device of a type including a gooseneck having an internal passageway for conducting a shielding gas and a wire guide for guiding a consumable wire electrode, comprising:

a diffuser body having a first end and a second end with a longitudinal axis extending therebetween, the diffuser body adapted to be connected to the gooseneck at the first end of the diffuser body, the diffuser body forming an internal blind bore that starts at the first diffuser body end, and forming internal threads and a concave surface adjacent to the second end of the diffuser body surrounding the longitudinal axis, the diffuser body blind bore that terminates at a central web, at least one web bore within the web spaced from the longitudinal axis, and a central electrode bore within the web, and a contact tip having a first end and a second end, the contact tip forming a convex surface surrounding the longitudinal axis at the first end of the contact tip and having external threads, the diffuser body adapted to receive the contact tip in an assembled condition wherein the concave and convex surfaces are brought into mating contact, and when the contact tip and diffuser body are in the assembled condition, the diffuser body and the contact tip forming a chamber, the contact tip forming at least one longitudinal first passageway segment oriented parallel to the longitudinal axis, the longitudinal first passageway segment communicating with the contact tip first end and the chamber, a second passageway segment formed within the contact tip communicating with the longitudinal first passageway segment and an outside surface of the contact tip, wherein the shielding gas flowing into the diffuser body passes through the diffuser body web bores into the chamber and into and through the first and second passageway segments to exit the contact tip.

2. The end assembly of claim 1, wherein the diffuser body forms at least one radial bore extending between the diffuser body blind bore and an outside surface of the diffuser body for conducting the shielding gas flowing inside the blind bore.

3. The end assembly of claim 1, wherein the at least one web bore has a portion radially outside an outer diameter of the wire guide.

4. The end assembly of claim 2, wherein the welding device further has a nozzle surrounding the diffuser body and the contact tip and forming an annular clearance with the diffuser body and the contact tip whereby the shielding gas flowing through the diffuser body radial bore flows into the annular clearance and toward the contact tip second end.

5. The end assembly of claim 1, wherein the first passageway segment is displaced from and parallel to a central electrode passageway of the contact tip, the first passageway segment communicating with the second passageway segment co-linear therewith and terminating at the outer surface of the contact tip at near the second end of the contact tip.

6. The end assembly of claim 5, wherein the contact tip has three pairs of the first and second co-linear passageway segments.

7. The end assembly of claim 1, wherein the longitudinal first passageway segment opens at the contact tip first end radially inside the diffuser body concave surface.

8. The end assembly of claim 1, wherein the first passageway segment is formed as a central longitudinal bore segment of the contact tip coaxial with the longitudinal axis providing for the passage of the wire electrode and providing an annular clearance with the wire electrode, and the second passageway segment is formed as a radial passageway through the contact tip intersecting the first passageway segment and a central electrode bore of the contact tip extending from the first passageway segment to the contact tip second end, with the central electrode bore of the contact tip having a bore diameter less than a bore diameter of the first passageway segment.

9. An end assembly for an arc welding device of a type including a gooseneck having an internal passageway for conducting a shielding gas and a wire guide for guiding a consumable wire electrode, comprising,
a diffuser body having a first end and a second end with a longitudinal axis extending therebetween, the diffuser body adapted to be connected to the gooseneck at the first end of the diffuser body, the diffuser body forming an internal blind bore that starts at the first diffuser body end, and forming internal threads and a concave surface adjacent to the second end of the diffuser body surrounding the longitudinal axis, the diffuser body blind bore that terminates at a central web, at least one web bore within the web spaced from the longitudinal axis, and a central electrode bore within the web, and
a contact tip having a first end and a second end, the contact tip forming a convex surface surrounding the longitudinal axis at the first end of the contact tip and external threads, the diffuser body adapted to receive the contact tip in an assembled condition wherein the concave and convex surfaces are brought into mating contact, and when the contact tip and diffuser body are in the assembled condition, the diffuser body and the contact tip forming a chamber, the contact tip forming a central electrode passageway adapted to receive the wire electrode coaxial with the longitudinal axis and, the central electrode passageway including at least one longitudinal first passageway segment, at least one second passageway segment intersecting the first passageway segment, the central electrode passageway communicating with the contact tip first end and the chamber and the contact tip second end, wherein the shielding gas flowing into the diffuser body passes through the diffuser body web bores into the chamber and into and through the central electrode passageway and the first and second passageway segments to exit at the contact tip.

10. The end assembly of claim 9, wherein the at least one first and second passageway segments are collinear and offset from the central electrode passageway and comprise a plurality of combined longitudinal passageways positioned surrounding the central electrode passageway.

11. An end assembly for an arc welding device of a type including a gooseneck having an internal passageway for conducting a shielding gas and a wire guide for guiding a consumable wire electrode comprising,
a diffuser body having a first end and a second end with a longitudinal axis extending therebetween, the diffuser body adapted to be connected to the gooseneck at the first end of the diffuser body, the diffuser body forming an internal blind bore that starts at the first diffuser body end, and forming internal threads and a concave surface adjacent to the second end of the diffuser body surrounding the longitudinal axis, the diffuser body blind bore that terminates at a central web, at least one web bore within the web spaced from the longitudinal axis, and a central electrode bore within the web, and
a contact tip having a first end and a second end, the contact tip forming a convex surface surrounding the longitudinal axis at the first end of the contact tip and external threads, the diffuser body adapted to receive the contact tip in an assembled condition wherein the concave and convex surfaces are brought into mating contact, and when the contact tip and diffuser body are in the assembled condition, the diffuser body and the contact tip forming a chamber, the contact tip forming a longitudinal first passageway segment oriented coaxial with the longitudinal axis, the longitudinal first passageway segment communicating with the contact tip first end and the chamber and adapted to receive the wire electrode, a second passageway segment formed within the contact tip intersecting with and communicating with the longitudinal first passageway segment and an outside surface of the contact tip, wherein the shielding gas flowing into the diffuser body passes through the diffuser body web bores into the chamber and into and through the first and second passageway segments to exit the contact tip.

12. The end assembly of claim 11, wherein the first longitudinal passageway segment having two sections with a first section extending from the contact tip first end to an intersection with the second passageway segment and a second section extending from the intersection to the contact tip second end, the second section having a bore diameter less than a bore diameter of the first section and adapted to closely receive and guide the wire electrode.

13. The end assembly of claim 11, wherein the second passageway is oriented perpendicular to the longitudinal axis and intersects the surface of the contact tip at diametrically opposite positions.

14. The end assembly of claim 13, wherein a pair of the second passageways are oriented perpendicular to one another and intersect at the first longitudinal passageway.

15. The end assembly of claim 13, wherein the surface of the contact tip is a side surface of the contact tip between the first and second ends of the contact tip.

16. The end assembly of claim 1, wherein the chamber is defined longitudinally between the diffuser and the contact tip and extends laterally through the longitudinal axis.

17. The end assembly of claim 16, wherein the chamber is disposed axially adjacent the central web.

18. The end assembly of claim 17, wherein the web bores extend longitudinally through the central web.

19. The end assembly of claim 18, wherein the central web extends laterally across the longitudinal axis and the central electrode bore is disposed at the longitudinal axis for passage of the electrode therethrough.

20. The end assembly of claim 19, wherein the central electrode bore and the web bores extend through the central web in the same direction.

* * * * *